United States Patent
Jang

(10) Patent No.: US 12,289,036 B2
(45) Date of Patent: Apr. 29, 2025

(54) PORTABLE POWER STORAGE DEVICE WITH A SELF-GENERATION AND NANO-CAPACITOR STORAGE STRUCTURE

(71) Applicant: Suk Ho Jang, Gwangmyeong-si (KR)

(72) Inventor: Suk Ho Jang, Gwangmyeong-si (KR)

(*) Notice: Subject to any disclaimer, the term of this patent is extended or adjusted under 35 U.S.C. 154(b) by 83 days.

(21) Appl. No.: 18/306,494

(22) Filed: Apr. 25, 2023

(65) Prior Publication Data
US 2024/0120802 A1    Apr. 11, 2024

(30) Foreign Application Priority Data
Oct. 5, 2022    (KR) .................. 10-2022-0126864

(51) Int. Cl.
| | | |
|---|---|---|
| *H02K 7/18* | (2006.01) | |
| *H02K 1/17* | (2006.01) | |
| *H02K 1/26* | (2006.01) | |
| *H02K 7/14* | (2006.01) | |

(52) U.S. Cl.
CPC ............... *H02K 7/183* (2013.01); *H02K 1/17* (2013.01); *H02K 1/26* (2013.01); *H02K 7/14* (2013.01)

(58) Field of Classification Search
CPC   H02K 7/183; H02K 1/17; H02K 1/26; H02K 7/14
See application file for complete search history.

(56) References Cited

U.S. PATENT DOCUMENTS

| | | | | |
|---|---|---|---|---|
| 2010/0001533 | A1* | 1/2010 | Jefferson | H02K 21/24 290/55 |
| 2016/0241117 | A1* | 8/2016 | Cheung | H02K 19/16 |
| 2022/0140674 | A1* | 5/2022 | Silvert | H02J 7/14 310/68 R |

FOREIGN PATENT DOCUMENTS

| | | |
|---|---|---|
| JP | 60174976 B2 | 9/1985 |
| JP | 2018011374 A | 1/2018 |
| JP | 202000125820 A | 8/2020 |
| KR | 1020090074186 A | 7/2009 |
| KR | 101141145 B1 | 5/2012 |
| KR | 101518819 B1 | 5/2015 |
| KR | 1020160068889 A | 6/2016 |

(Continued)

OTHER PUBLICATIONS

WO-2018117555-A1_translate (Year: 2018).*
KR20190040572A_translate (Year: 2019).*

*Primary Examiner* — Tulsidas C Patel
*Assistant Examiner* — Mohammed Ahmed Qureshi
(74) *Attorney, Agent, or Firm* — NKL LAW; Jae Youn Kim

(57) ABSTRACT

The present invention provides a portable power storage device, and in particular, a portable power storage device with a self-generation and nano-capacitor storage structure. The portable power storage device includes: opposite fixed magnet plates disposed on both sides of a main body and having a plurality of radially arranged induction magnet bodies; and a rotating coil plate disposed between the opposite fixed magnet plates and having a plurality of radially arranged coil bodies to perform mutual induction action with the induction magnet bodies, such that when the rotating coil plate is rotated or reciprocated, electric charges are induced in the coil bodies by the induction magnet bodies to generate current, thereby electricity may be easily generated and used at all times regardless of the location, as well as the stored electricity may be output and used in a portable electric device as necessary.

8 Claims, 10 Drawing Sheets

(56) References Cited

FOREIGN PATENT DOCUMENTS

| KR | 20190040572 A | * | 4/2019 | |
|----|---------------|---|--------|---|
| KR | 1020190040572 A | | 4/2019 | |
| KR | 1020200142234 A | | 12/2020 | |
| WO | WO-2018117555 A1 | * | 6/2018 | ............... H02K 1/27 |

* cited by examiner

PORTABLE POWER STORAGE DEVICE WITH A SELF-GENERATION AND NANO-CAPACITOR STORAGE STRUCTURE

CROSS REFERENCE TO RELATED APPLICATIONS

This application claims the priority benefit of Korean Patent Application No. 10-2022-0126864 filed on Oct. 5, 2022, the entirety of which is incorporated by reference herein.

BACKGROUND OF THE INVENTION

1. Field of the Invention

The present invention relates to a portable power storage device, and more particularly, to a portable power storage device with a self-generation and nano-capacitor storage structure, which is portable and includes: opposite fixed magnet plates disposed on both sides of a main body and having a plurality of radially arranged induction magnet bodies; and a rotating coil plate disposed between the opposite fixed magnet plates and having a plurality of radially arranged coil bodies, such that when a predetermined operation of rotating or reciprocating occurs, the induction magnet body and the coil body may perform mutual induction action to generate an induced current, thus to produce electricity, and the produced electricity may be stored in a power storage unit and output for using an electric device.

2. Description of the Related Art

In general, a power storage device includes a storage battery which stores electricity generated through common solar power generation, wind power generation, electromagnetic induction power generation, and the like, or a portable auxiliary battery which can store and use electricity as necessary.

Meanwhile, with the spread of various portable electric devices such as a mobile phone, an electric fan, or the like in recent years, use of an electric device that can be supplied with electricity from the portable auxiliary battery even outdoors is increasing. In this situation, since such the portable auxiliary battery can be repeatedly charged and discharged, electricity of a predefined capacity may be stored therein, and a user may carry it and use as necessary.

However, the portable auxiliary battery as described above has a problem in that the portable electric device can no longer be used when all the power stored therein is discharged.

In addition, in order to store electricity again, the portable auxiliary battery as described above should be charged through a separate general electricity supply means. Therefore, when there is no power supply source, the portable auxiliary battery cannot be charged, and thus the use of the portable electric device is limited.

PRIOR ART DOCUMENT

Patent Document (Patent Document 1) Korean Patent Laid-Open Publication No. 10-2020-0142234.

(Patent Document 2) Korean Patent Registration Publication No. 10-1518819.

SUMMARY OF THE INVENTION

The present invention has been made to solve the various problems as described above, and it is an object to provide a portable power storage device with a self-generation and nano-capacitor storage structure, which includes: opposite fixed magnet plates disposed on both sides of a main body and having a plurality of radially arranged induction magnet bodies; and a rotating coil plate disposed between the opposite fixed magnet plates and having a plurality of radially arranged coil bodies to perform mutual induction action with the induction magnet bodies, such that when the rotating coil plate is rotated or reciprocated, electric charges are induced in the coil bodies by the induction magnet bodies to generate current, thereby electricity may be easily generated and used at all times regardless of the location.

In addition, another object of the present invention is to provide a portable power storage device with a self-generation and nano-capacitor storage structure, which store the generated electricity in a power storage unit having a nano-capacitor structure capable of charging with high efficiency, such that the stored electricity may be output and used in a portable electric device as necessary.

Further, another object of the present invention is to provide a portable power storage device with a self-generation and nano-capacitor storage structure, in which a power storage unit is formed in a rotating coil plate to be eccentric from a center thereof to one side, such that the rotating coil plate may be rotated or reciprocated about a rotor shaft even with a small movement, and thereby easily producing electricity and storing it in a power storage unit while carrying and moving the inventive device.

To achieve the above objects, according to an aspect of the present invention, there is provided a portable power storage device with a self-generation and nano-capacitor storage structure including: a shaft assembly which includes a non-conductive rotor shaft having a tool connection part formed at an end thereof, and conductive fixed shafts disposed on both sides of the rotor shaft to face each other at positions spaced apart from a center thereof, wherein bearings are mounted between the rotor shaft and the fixed shafts; a rotating coil plate which is made of a non-conductive material and is coupled to the rotor shaft between the fixed shafts, wherein bearings are mounted between an inner circumference thereof and outer circumferences of the fixed shafts so as to allow the rotating coil plate to rotate freely, wherein a plurality of coil bodies having a core-less coil winding structure are radially arranged in the rotating coil plate; a pair of opposite fixed magnet plates which is made of an aluminum material so as to have conductivity, and is mounted on the opposite fixed shafts so as to be spaced apart from both sides of the rotating coil plate, wherein a plurality of induction magnet bodies and corresponding to the coil bodies are arranged radially therein, and a plurality of opening parts are alternately formed between adjacent induction magnet bodies, wherein the respective outer peripheries of the fixed magnet plates are connected to each other through a clamp ring; a power storage unit which is installed in the rotating coil plate, and is connected to the coil bodies through a rectifying element and a constant voltage unit to store generated electricity, wherein the power storage unit is configured to conduct electricity with the fixed magnet plates through a connection terminal to receive electricity from the fixed magnet plates; and a main body in which both ends of the rotor shaft are exposed to an outside, and is configured to surround and accommodate the rotating coil plate and the fixed magnet plates so that the fixed shafts and the fixed magnet plates are fixed therein, wherein an output connector is installed therein, which is connected to the fixed magnet plates to receive electricity and output it to an outside, wherein, when the rotating coil plate rotates, electricity is generated by induction action between the coil bodies and the induction magnet bodies of the fixed magnet plates, and the generated electricity is stored in the power storage unit, and wherein the power storage unit is installed at a position where it is eccentric from the center of the rotating coil plate to one side, such that a center of gravity of the rotating coil plate is always positioned at a lower portion thereof.

Preferably, the coil bodies installed in the rotating coil plate penetrate both sides of the rotating coil plate, to perform mutual induction action with the induction magnet bodies installed in the opposite fixed magnet plates.

Preferably, the coil bodies of the rotating coil plate have a winding structure in which a winding direction of a coil of a coil body is opposite to the winding direction of a coil of another coil body adjacent thereto, and the induction magnet bodies of the fixed magnet plates are configured so that they have opposite polarities at positions to face each other.

Preferably, the opposite fixed magnet plates further include brushes which are installed on a surface corresponding to the rotating coil plate so as to conduct electricity, and the brushes are connected to the connection terminal of the power storage unit so as to conduct electricity.

Preferably, the power storage unit includes a nano-capacitor.

As described above, according to the portable power storage device with a self-generation and nano-capacitor storage structure of the present invention, the following effects may be obtained. Through the arrangement of the fixed magnet plates and the rotating coil plate, when the rotating coil plate rotates, electric charges are induced in the coil bodies by the induction magnet bodies to generate current, thereby electricity may be easily generated and used at all times regardless of the location.

In addition, through the configuration of the power storage unit having a nano-capacitor structure capable of charging with high efficiency, it is possible to implement quick and excellent charging efficiency of the produced electricity, and use high power electricity.

Further, since the power storage unit is formed in the rotating coil plate to be eccentric, even if a small movement occurs in the rotating coil plate due to its own weight toward the bottom, the rotating coil plate may be rotated or is rotated or reciprocated to generate electricity, and it is possible to generate and charge electricity at all times even during operation such as walking while carrying the inventive device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
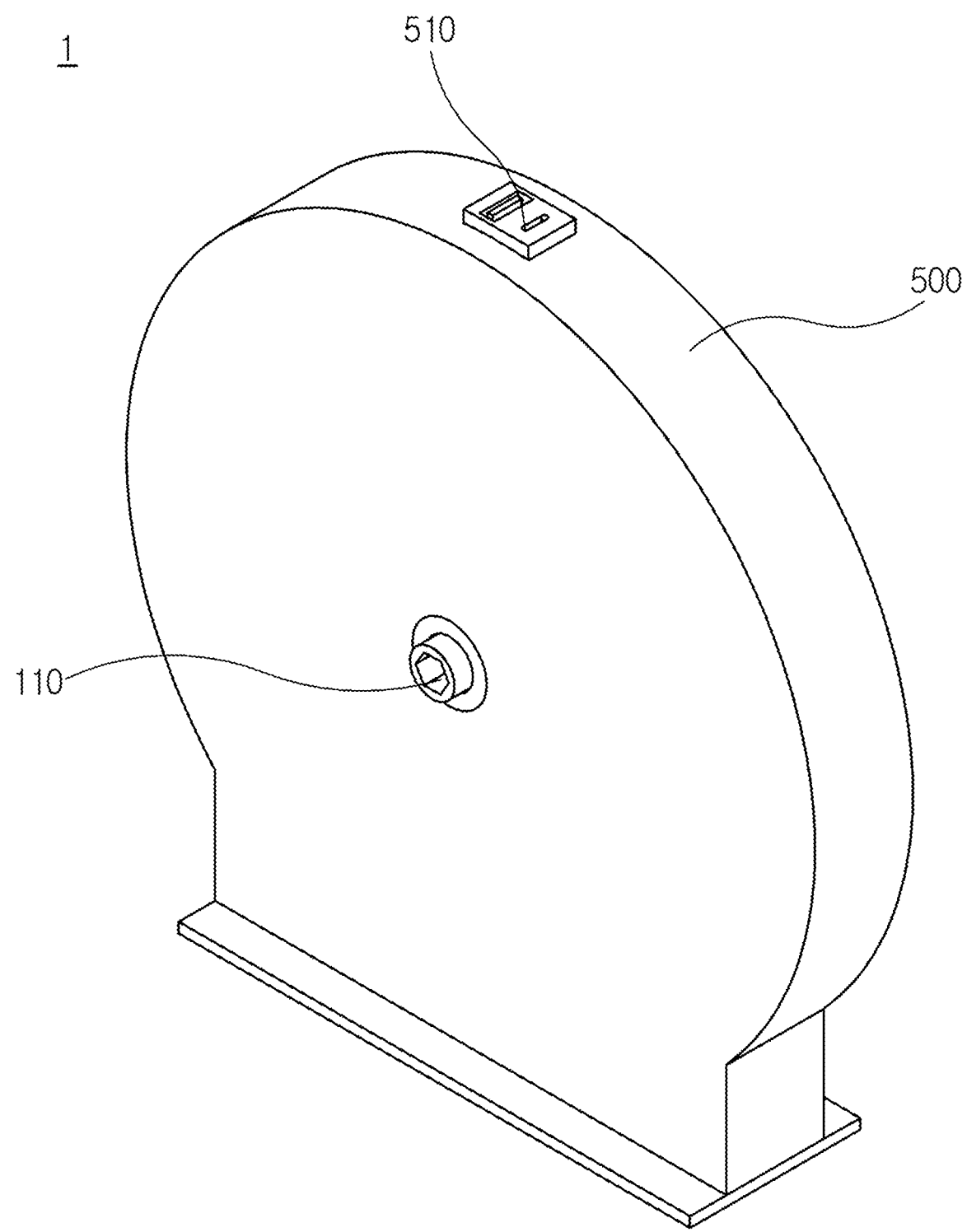
FIG. 1 is a perspective view illustrating a portable power storage device with a self-generation and nano-capacitor storage structure of the present invention.

Prior to the detailed description of the present invention, the terms and words used in the present disclosure and claims, which will be described below, should not be construed as limited to a conventional or lexical meaning, and should be understood as appropriate notions by the inventor based on that he/she is able to define terms to describe his/her invention in the best way to be seen by others.

Accordingly, embodiments described in the present disclosure and configurations illustrated in the drawings are simply the most preferred embodiment and do not represent all the technical sprites of the present invention, and it will be understood that various modifications and equivalents may be made to take the place of the embodiments at the time of filling the present application.

Hereinafter, preferred embodiments of the present invention will be described in detail with reference to the accompanying drawings.

Figure 2:
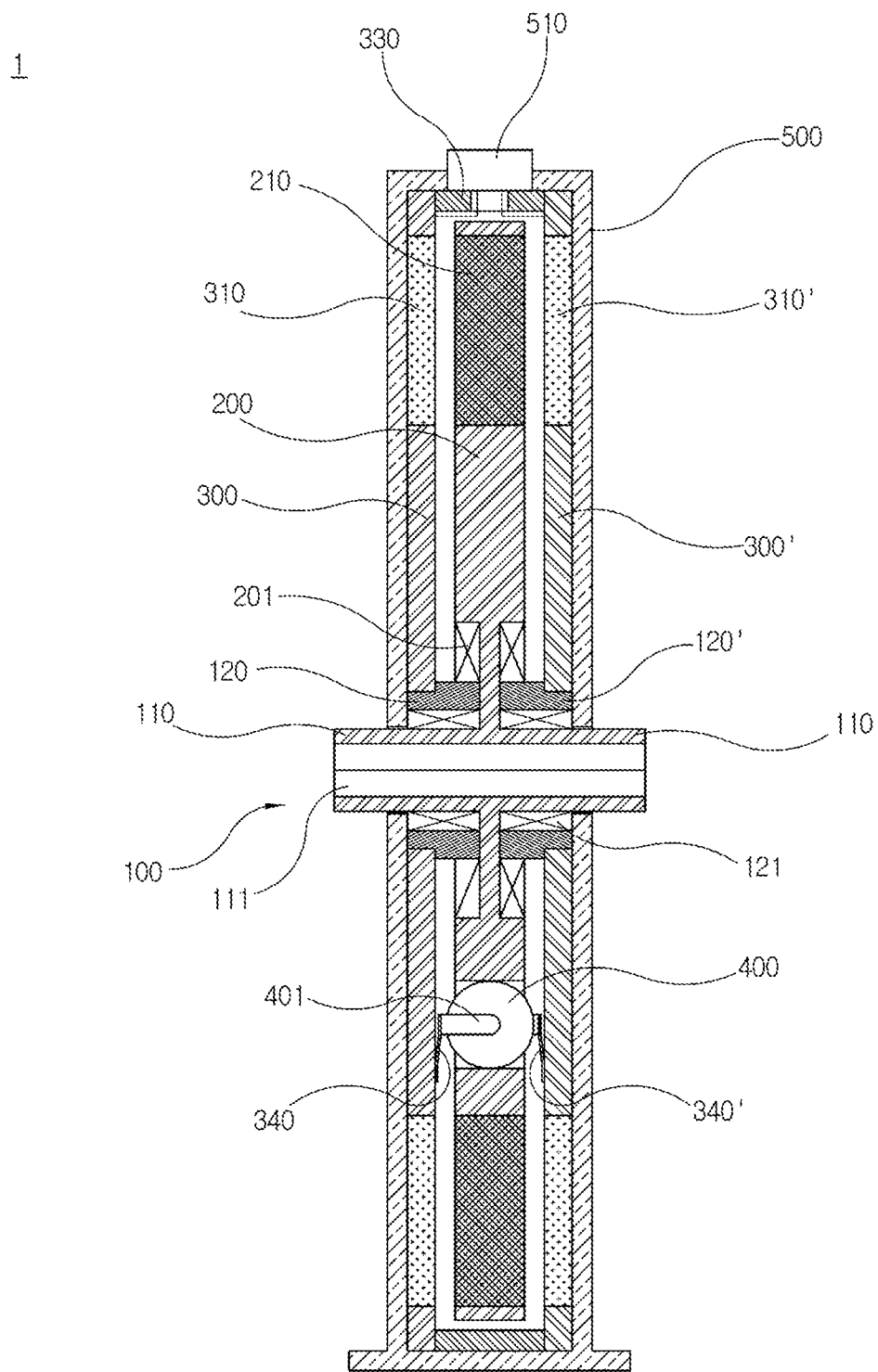
FIG. 2 is a cross-sectional view illustrating the portable power storage device with a self-generation and nano-capacitor storage structure of the present invention.
Figure 3:
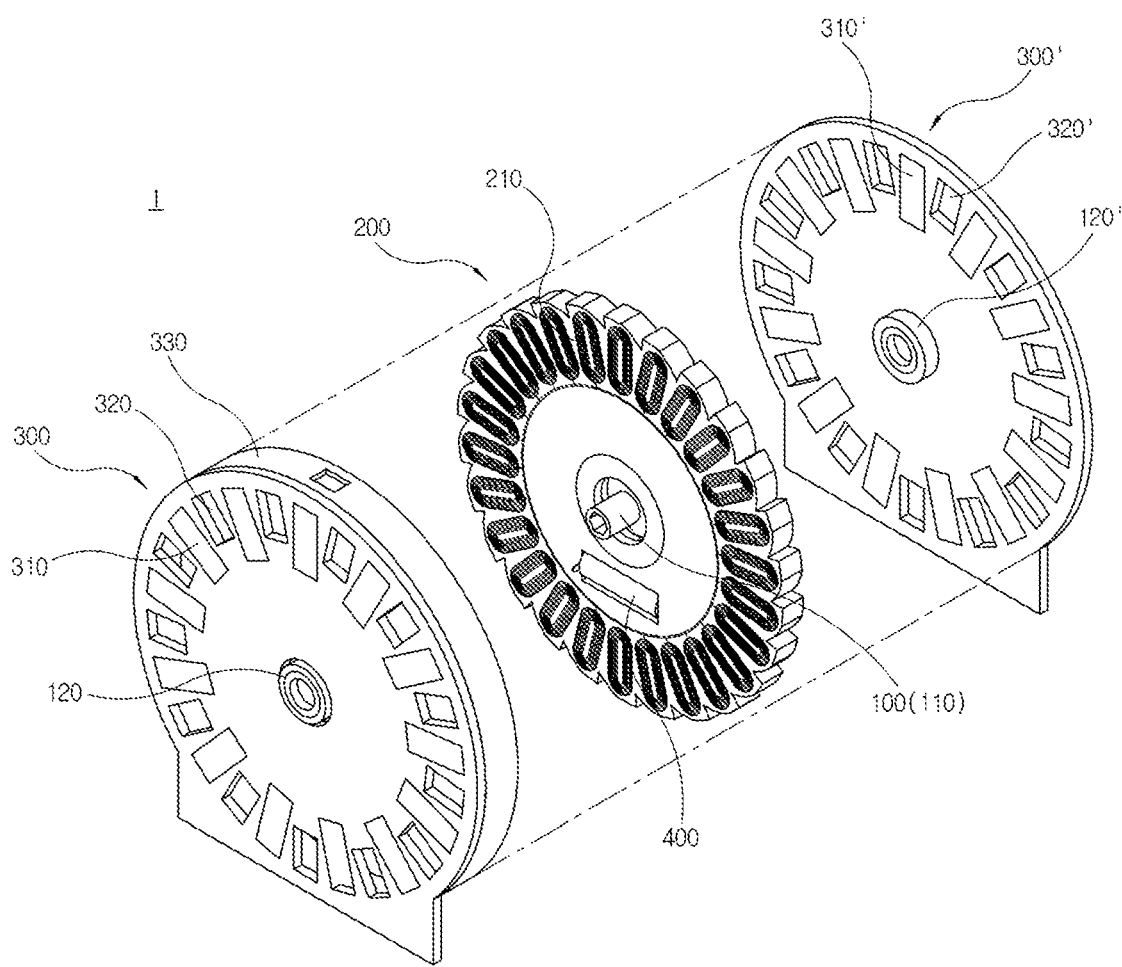
FIG. 3 is an exploded perspective view illustrating major components of the portable power storage device with a self-generation and nano-capacitor storage structure of the present invention.
Figure 4:
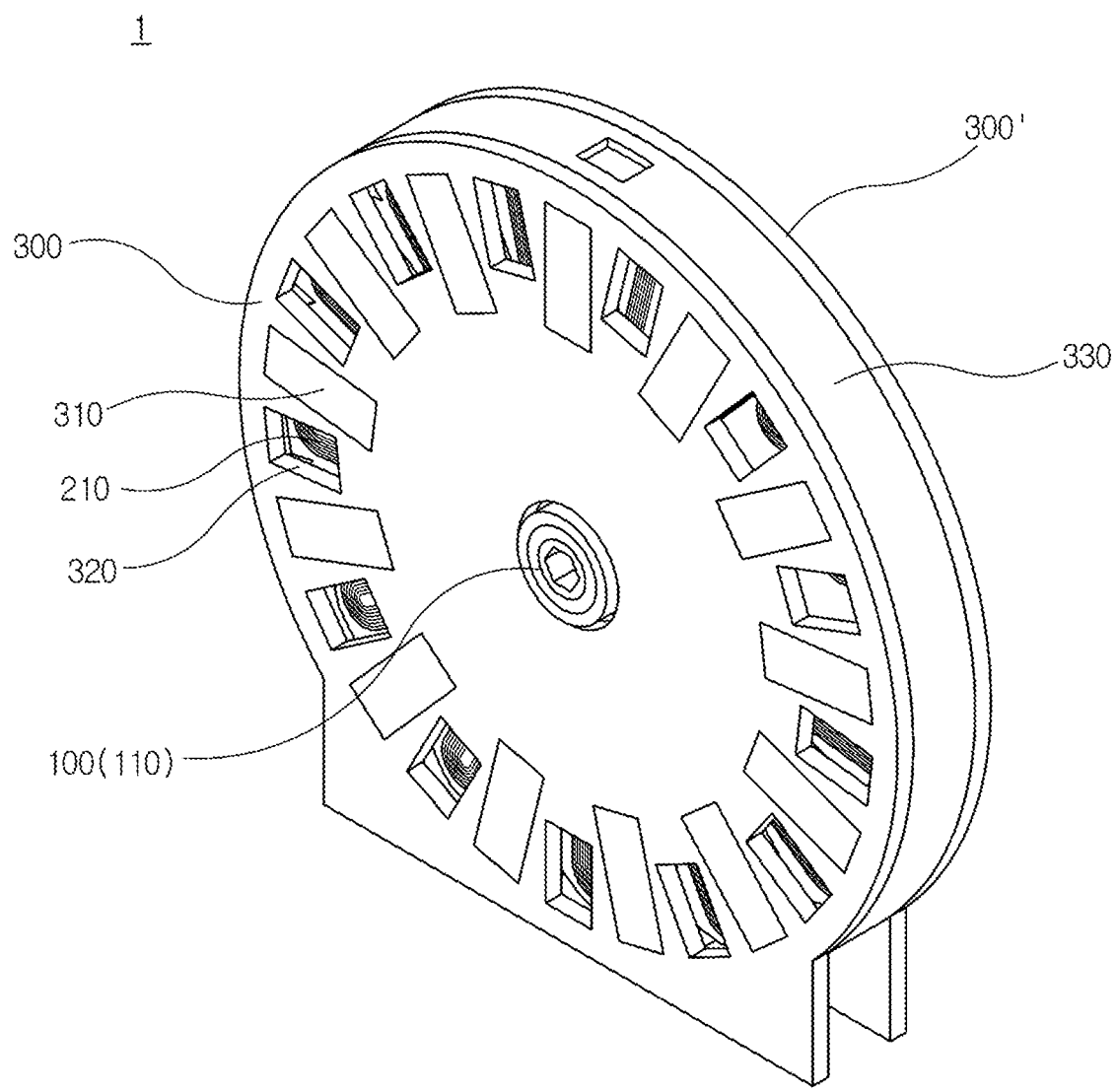
FIG. 4 is an assembled perspective view illustrating a major component of the portable power storage device with a self-generation and nano-capacitor storage structure of the present invention.
Figure 5:
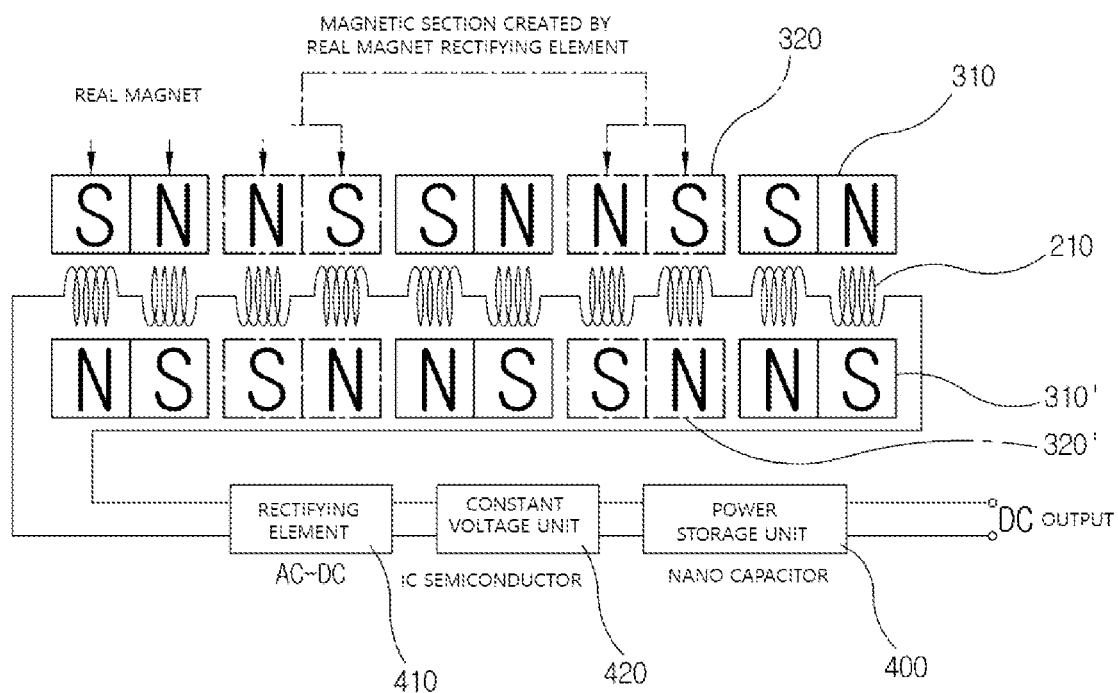
FIG. 5 is a schematic diagram illustrating another major component of the portable power storage device with a self-generation and nano-capacitor storage structure of the present invention.

FIG. 1 is a perspective view illustrating a portable power storage device with a self-generation and nano-capacitor storage structure of the present invention, FIG. 2 is a cross-sectional view illustrating the portable power storage device with a self-generation and nano-capacitor storage structure of the present invention, FIG. 3 is an exploded perspective view illustrating major components of the portable power storage device with a self-generation and nano-capacitor storage structure of the present invention, FIG. 4 is an assembled perspective view illustrating the major components of the portable power storage device with a self-generation and nano-capacitor storage structure of the present invention, and FIG. 5 is a schematic diagram illustrating another major component of the portable power storage device with a self-generation and nano-capacitor storage structure of the present invention.

Referring to FIGS. 1 to 5, a portable power storage device 1 with a self-generation and nano-capacitor storage structure of the present invention includes a shaft assembly 100, a rotating coil plate 200, fixed magnet plates 300 and 300', a power storage unit 400, and a main body 500.

First, in the portable power storage device 1 with a self-generation and nano-capacitor storage structure of the present invention, the shaft assembly 100 configured to rotate the rotating coil plate 200, which will be described below, by the rotor shaft 110 to provide a rotational force, while the fixed magnet plates 300 and 300' are fixed to the main body 500 and configured to rotatably support the rotor shaft 110.

To this end, the shaft assembly 100 first includes a rotor shaft 110. The rotor shaft 110 is made of a non-conductive material, is configured to induce rotation of the rotating coil plate 200 which will be described below, and includes tool connection parts 111 formed at both ends thereof, to which a common tool or lever may be coupled. In the present invention, the tool connection part is preferably formed in a hexagonal groove shape.

In addition, the shaft assembly 100 includes a pair of opposite fixed shafts 120 and 120' disposed on both sides of the rotor shaft 110 to face each other at positions spaced apart from a center in a longitudinal direction thereof. Each of the fixed shaft 120, 120' is made of a conductive aluminum material. Bearings 121 are mounted between an outer circumference of the rotor shaft 110 and inner circumferences of the fixed shafts 120 and 120', such that the fixed shafts 120 and 120' serve to rotatably support the rotor shaft 110 with being fixed to the main body 500.

In the portable power storage device 1 with a self-generation and nano-capacitor storage structure of the present invention, the rotating coil plate 200 is configured to rotate together with the rotor shaft 110 during operation, and receive electric charges from the fixed magnet plates 300 and 300', which will be described below, to produce electricity.

To this end, the rotating coil plate 200 is formed in a disc shape using a non-conductive material through which electricity is not conducted, and is disposed at the center of the rotor shaft 110 to be rotated by the rotor shaft 110 during operation. The bearings 201 are mounted between the outer circumference of the rotor shaft 110 and the inner circumferences of the fixed shafts 120 and 120', so as to allow the rotating coil plate 200 to rotate freely.

In addition, the rotating coil plate 200 includes a plurality of coil bodies 210 radially arranged therein so as to substantially generate electric power. At this time, in the present invention, each of the coil bodies 210 are connected to each other, and are configured to have a core-less coil winding structure rather than a common core winding structure.

In particular, in the present invention, the coil bodies 210 installed in the rotating coil plate 200 penetrate both sides of the rotating coil plate 200, to perform mutual induction action with the induction magnet bodies 310 and 310' installed in the opposite fixed magnet plates 300 and 300' which will be described below.

In the portable power storage device 1 with a self-generation and nano-capacitor storage structure of the present invention, the fixed magnet plates 300 and 300' perform induction action with the rotating coil plate 200 to induce electric charges.

To this end, the fixed magnet plates 300 and 300' are formed of a conductive material in the disc shape, and have a structure in which a pair of plates face each other on both sides. In a state of being spaced apart from the rotating coil plate 200 on both sides, the center portion thereof is mounted on the opposite fixed shafts 120 and 120'. Preferably, the fixed magnet plates 300 and 300' have a larger diameter than that of the rotating coil plate 200, and outer peripheries thereof are connected to each other through a clamp ring 330 on both sides.

In addition, each of the fixed magnet plates 300 and 300' includes a plurality of induction magnet bodies 310 and 310' arranged radially therein to interact with the coil bodies 210 of the rotating coil plate 200 and a plurality of opening parts 320 and 320' alternately arranged between the adjacent induction magnet bodies 310 and 310'. The induction magnet bodies 310 and 310' arranged on the surface corresponding to the coil bodies 210 is formed by the number corresponding to ½ of the number of coil bodies 210. That is, for two coil bodies 210, each one induction magnet body 310, 310' is alternately arranged.

At this time, in the present invention, as described above, if the number of induction magnet bodies 310 and 310' is configured to correspond to ½ of the number of coil bodies 210, the induction magnet bodies 310 and 310' are arranged so that magnets having different polarities are disposed to face each other while reducing the number thereof with the opening parts 320 and 320' interposed therebetween. Therefore, since new magnetism is generated in the opening parts 320 and 320', an effect obtained by an increase in the number of the induction magnet bodies 310 and 310' may be achieved.

Therefore, when the rotating coil plate 200 rotates, the coil bodies 210 interact with the induction magnet bodies 310 and 310' of the fixed magnet plates 300 and 300' to induce electric charges in the coil body 210, and the coil bodies 210 receive the electric charges to generate electricity.

Meanwhile, as described above, the inventive device is provided with the coil bodies 210 of the rotating coil plate 200 and the induction magnet bodies 310, 310' of the fixed magnet plates 300 and 300', such that it is possible to exhibit excellent power generation performance.

To this end, first, the coil bodies 210 of the rotating coil plate 200 have a winding structure in which a winding direction of a coil of a coil body is opposite to the winding direction of a coil of another coil body 210 adjacent thereto.

In addition, the induction magnet bodies 310 and 310' of the opposite fixed magnet plates 300 and 300' are configured to have different polarities at positions facing each other.

That is, in the present invention, the winding directions of coils in an S section and an N section of the coil bodies 210 are configured to differ from each other in order to match the generated power, and thereby, the polarities of the induction magnet bodies 310 and 310' are arranged so that the phase is stably formed even in the virtual magnetic section.

In the portable power storage device 1 with a self-generation and nano-capacitor storage structure of the present invention, the power storage unit 400 is configured to store electricity generated by the coil bodies 210.

To this end, the power storage unit 400 is configured to be connected to the coil bodies 210 of the rotating coil plate 200 through a common AC-DC rectifying element 410 and a constant voltage unit 420 composed of an IC semiconductor or the like.

At this time, in the present invention, the power storage unit 400 includes connection terminals 401 for positive (+) and negative (−) formed on both sides thereof. In this case, the connection terminals 401 are configured to conduct electricity with the opposite fixed magnet plates 300 and 300'.

In addition, as described above, in the present invention, as a means for conducting electricity between the power storage unit 400 and the fixed magnet plates 300 and 300', the fixed magnet plates 300 and 300' further include brushes 340 and 340' which are installed on a surface corresponding to the rotating coil plate 200 so as to conduct electricity, and connected to the connection terminals 401. Therefore, it is possible to achieve a stable electrical conduction between the components.

Meanwhile, the power storage unit 400 applied to the present invention may be composed of a common storage battery capable of storing power, and is preferably composed of a nano-capacitor in the present invention. At this time, as is known in the art, the nano-capacitor is configured in the form of an ultra-thin film, thereby having a 90% charge rate and semi-permanent life-span without non-explosive spontaneous discharge. Therefore, it is possible to use the inventive device with high efficiency.

In addition, when installing the power storage unit 400 in the rotating coil plate 200 according to the present invention, it is preferable to arrange it at a position eccentric from the center of the rotating coil plate 200 to one side. The purpose of this configuration is to position the center of gravity of the rotating coil plate 200 at a lower portion thereof.

That is, when the center of gravity is positioned at the lower portion, even if a small movement occurs while carrying the portable power storage device 1 with a self-generation and nano-capacitor storage structure of the present invention, the rotating coil plate 200 is reciprocated or moved from side to side according to the movement of the center of gravity.

In the portable power storage device 1 with a self-generation and nano-capacitor storage structure of the present invention, the main body 500 is configured to surround and accommodate the rotating coil plate 200 and the fixed magnet plates 300 and 300' having the above-described structure.

To this end, the rotor shaft 110 is disposed so that both ends thereof are exposed to both sides of the main body 500, and the fixed shafts 120 and 120' and the fixed magnet plates 300 and 300' are disposed inside the main body 500 to be fixed thereto. At this time, the rotating coil plate 200 is supported so as to freely rotate within the main body 500 with respect to the fixed shafts 120 and 120' through bearings 201.

In addition, the main body 500 includes an output connector 510 installed on one side thereof to be connected to the opposite fixed magnet plates 300 and 300' so as to supply and output the power to an outside. In this case, the output connector 510 may use a variety of common USB ports or mobile phone charging ports, but it is not limited thereto.

Further, in the present invention, it is natural that the main body 500 may be provided with a handle or a hook (not shown in the drawings) so that the inventive device can be held by hand or hung.

Meanwhile, the portable power storage device with a self-generation and nano-capacitor storage structure of the present invention may be configured to be charged and used through various structures as described below with reference to FIGS. 6 to 8.

Figure 6:
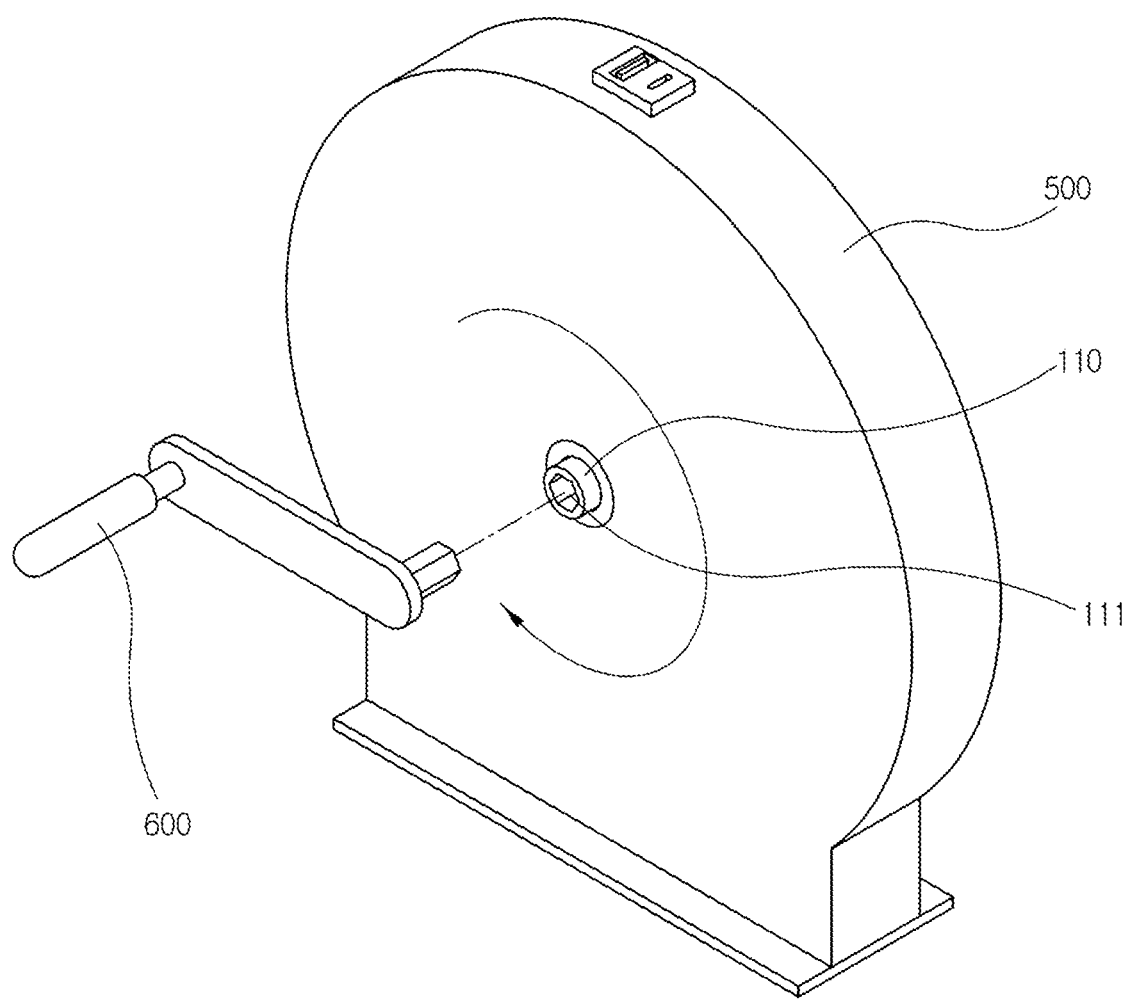
FIG. 6 is a perspective view illustrating a portable power storage device with a self-generation and nano-capacitor storage structure according to another embodiment of the present invention.

To this end, referring to FIG. 6, first, a rotary operation lever 600 may be detachably coupled to the tool connection part 111 of the rotor shaft 110 and apply a rotational force to the rotor shaft 110 during operation. When rotating the rotary operation lever 600, the rotor shaft 110 and the rotating coil plate 200 connected thereto are rotated so that electricity can be generated.

Figure 7:
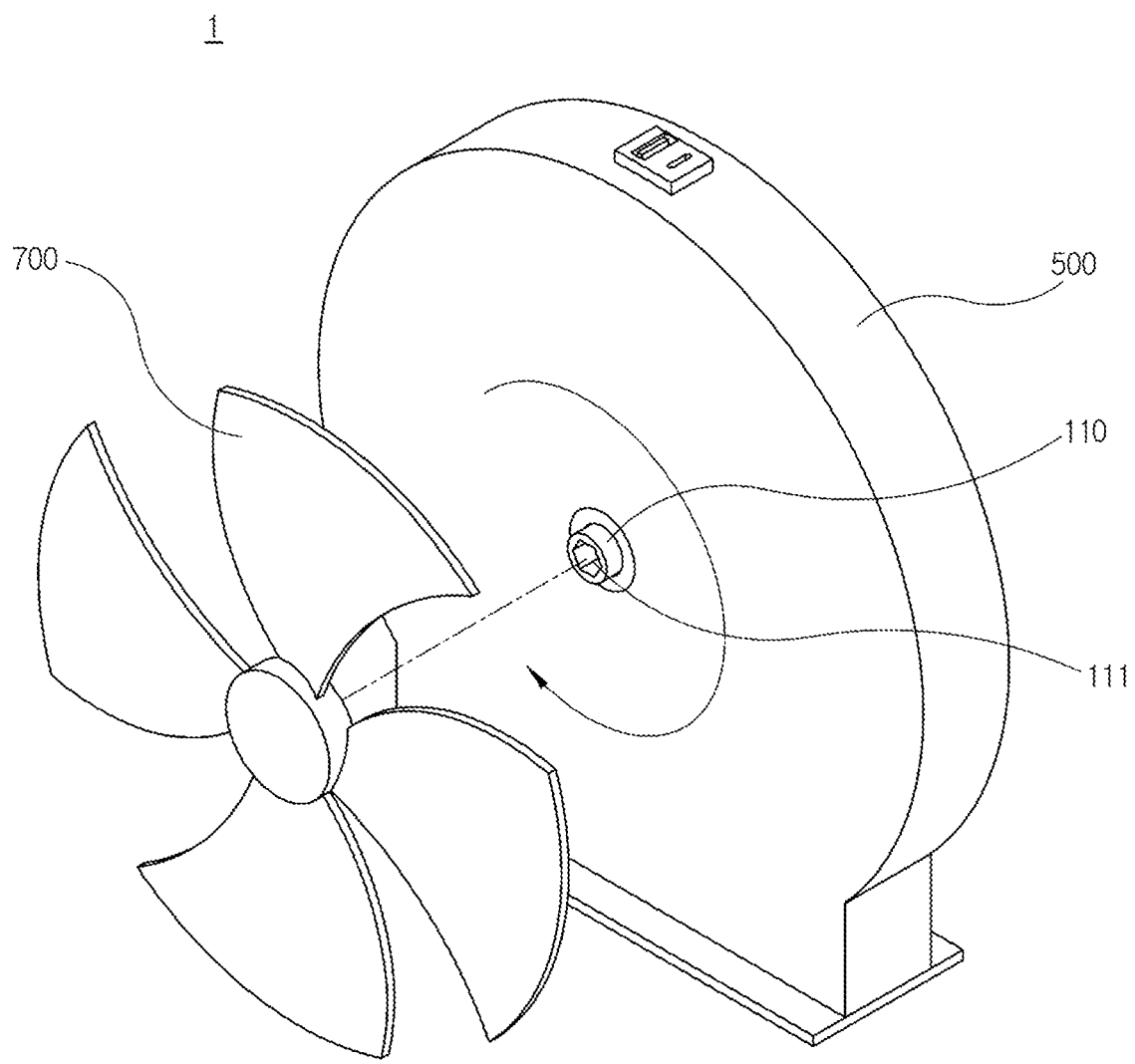
FIG. 7 is a perspective view illustrating a portable power storage device with a self-generation and nano-capacitor storage structure according to another embodiment of the present invention.

In addition, referring to FIG. 7, a fan 700 may be detachably coupled to the tool connection part 111 of the rotor shaft 110 to convert wind energy into rotational motion during operation. When the fan 700 rotates during operation, the rotor shaft 110 and the rotating coil plate 200 connected thereto are rotated so that electricity can be generated.

Figure 8:
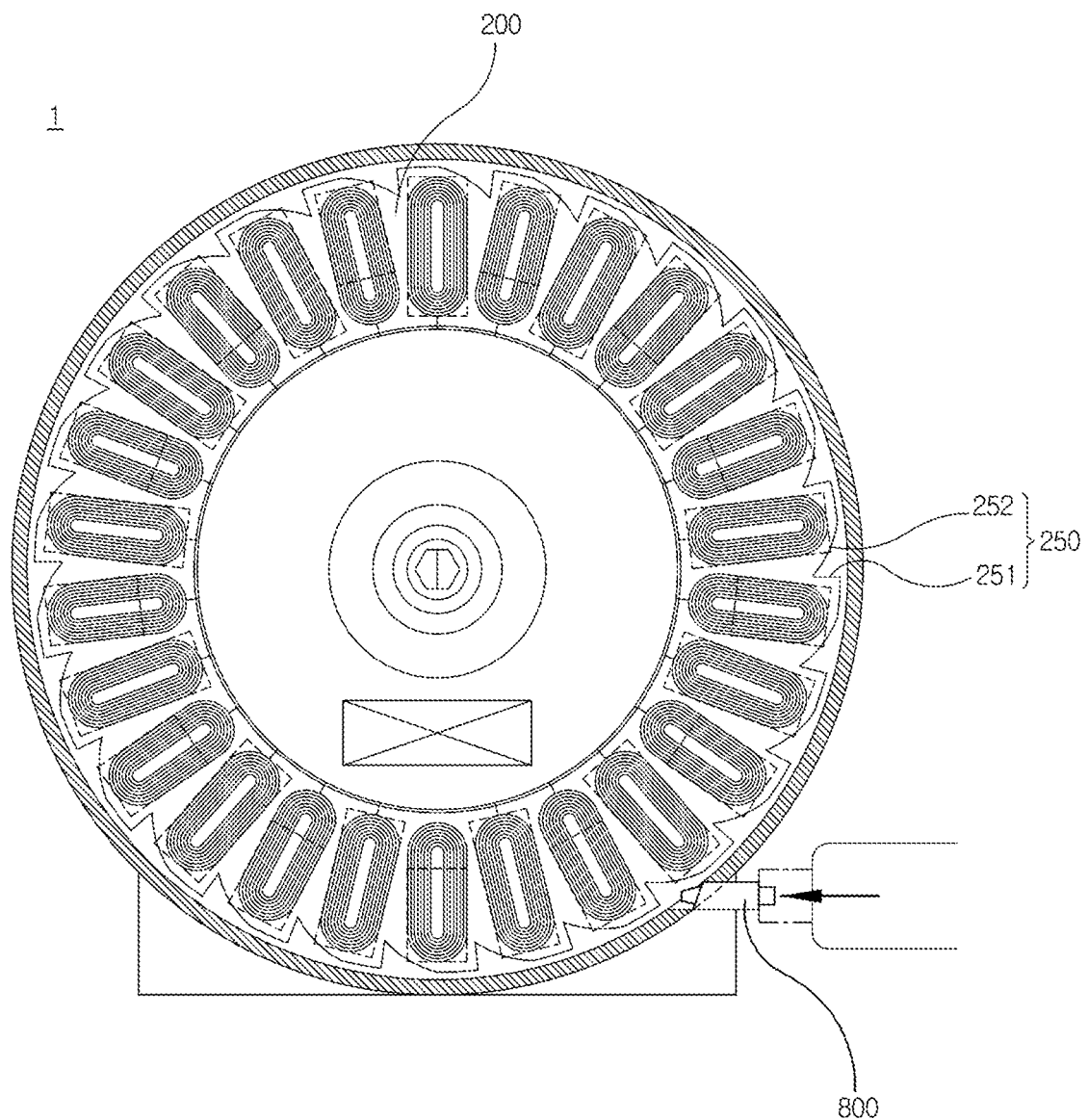
FIG. 8 is a cross-sectional view illustrating a portable power storage device with a self-generation and nano-capacitor storage structure according to another embodiment of the present invention.

Further, referring to FIG. 8, the rotating coil plate 200 may further include sawteeth 250 including linear parts 251 and inclined parts 252 continuously and alternately formed on an outer circumference thereof.

In addition, the main body 500 may further include an air injection nozzle 800 that can be detachably connected to a common air injector. The air injection nozzle 800 is inserted into the clamp ring 330 of the fixed magnet plates 300 and 300', and may be configured in such a way that an inner end thereof is disposed to face the linear parts 251 of the sawteeth 250, and an outer end thereof is exposed to an outside of the main body 500.

Therefore, when injecting air into the air injection nozzle 800 after the air injector is connected thereto, the injected air is supplied to the linear parts 251 of the sawteeth 250, and the rotating coil plate 200 is rotated by the pressured air so that electricity can be generated.

Hereinafter, an operation of the portable power storage device with a self-generation and nano-capacitor storage structure according to the present invention having the configuration as described above will be described in detail with reference to the accompanying drawings.

Referring again to FIGS. 1 to 5, the portable power storage device 1 with a self-generation and nano-capacitor storage structure of the present invention can easily generate and use electricity anytime anywhere through self-generation power without charging using a separate power supply. In particular, even in the process of carrying and moving it, power generation and charging may be easily performed.

First, a process of generating electricity through self-generation will be described.

The portable power storage device 1 with a self-generation and nano-capacitor storage structure of the present invention may generate electricity through an operation of rotating or reciprocating the rotating coil plate 200.

That is, when the rotating coil plate 200 is rotated or reciprocated, a positive sign or a negative sign is instantaneously switched and induced in the instant of entering the moment the coil body 210 between the induction magnet bodies 310 and 310'. The coil body 210 generates electricity by receiving electric charges from the induction magnet bodies 310 and 310'. The electricity generated in this way is stored in the power storage unit 400 through the rectifying element 410 and the constant voltage unit 420.

In particular, in the present invention, as described above, by using the nano-capacitor capable of charging and outputting electricity with high efficiency in order to store the generated electricity, rapid charging as well as high output may be achieved.

Meanwhile, as described above, the portable power storage device 1 with a self-generation and nano-capacitor storage structure according to the present invention may induce various operations of the rotating coil plate 200, such as rotation or reciprocation.

First, in the rotating coil plate 200, the power storage unit 400 is installed at a position where it is eccentric from the center of the rotating coil plate 200 to one side, such that the center of gravity is always directed downward and positioned lower side.

Figure 9:
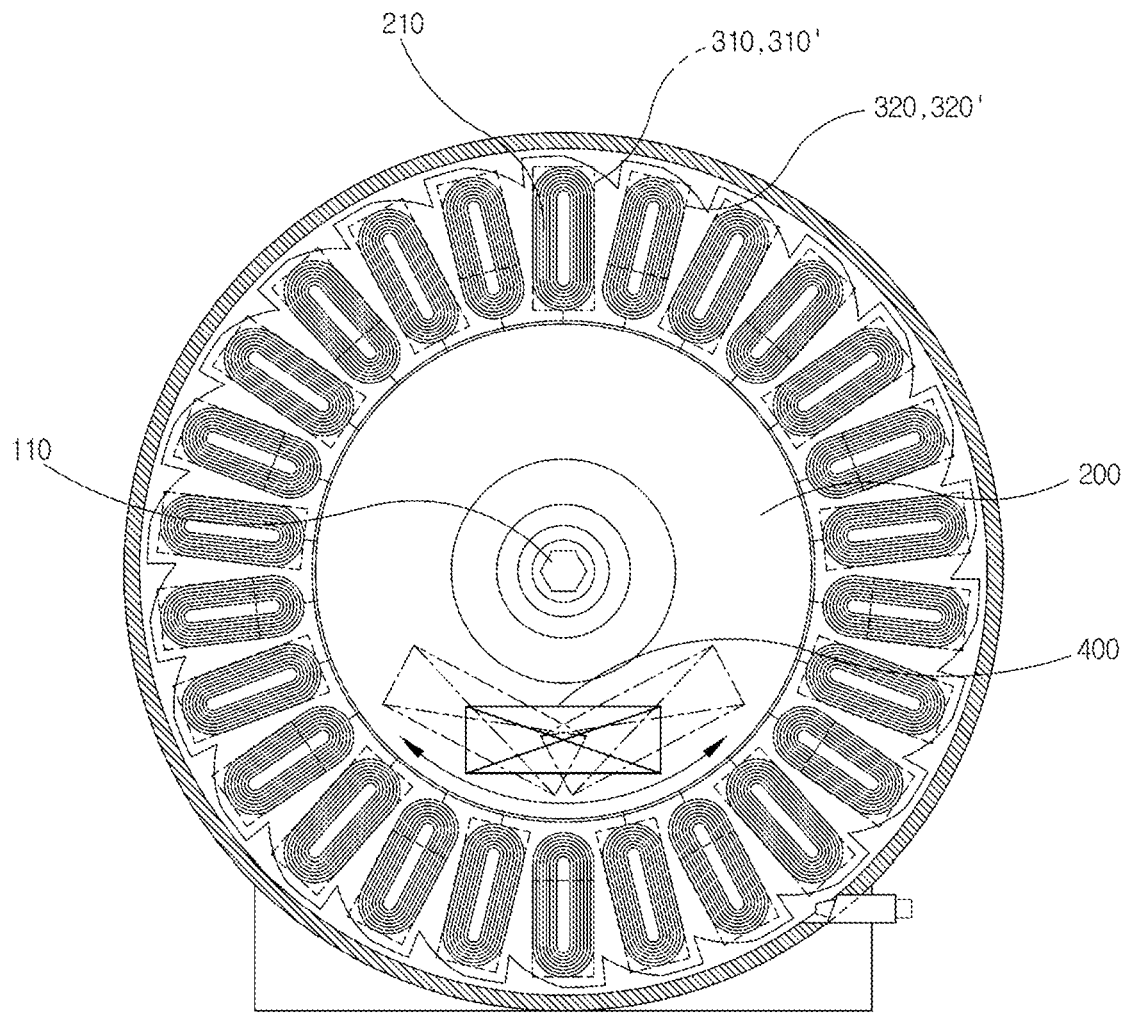
FIG. 9 is a cross-sectional view illustrating an operating state of generating electricity in the portable power storage device with a self-generation and nano-capacitor storage structure of the present invention.

Accordingly, referring to FIG. 9, when the portable power storage device 1 with a self-generation and nano-capacitor storage structure of the present invention is carried in a bag or moved while being held by hand, reciprocating such as pendulum motion may occur due to the weight of the power storage unit 400. In this process, the rotating coil plate 200 is reciprocated or moved from side to side in the direction indicated by arrows, thus electricity may be generated by the mutual induction action between the coil bodies 210 and the induction magnet bodies 310 and 310' and opening parts 320 and 320'.

That is, as long as the inventive device is always carried and moved, power generation is naturally performed, thereby electricity can be easily charged and produced anytime anywhere.

In addition, in another embodiment shown in FIG. 6, in a state where the storage inventive device is fixed, that is, in a state where the main body 500 is placed on a desk, or the like, when connecting the rotary operation lever 600 to the tool connection part 111 of the rotor shaft 110, and then rotating the rotary operation lever 600, the rotating coil plate 200 can be rotated to generate electricity.

Further, in another embodiment shown in FIG. 7, the inventive device may be used at a place where wind is generated when using the rotating fan 700 having a rotational force against wind. That is, when wind blows and the fan 700 rotates while the main body 500 is placed on the ground, electricity can be generated while the rotating coil plate 200 is rotated by the fan. In other words, electricity can also be used through some form of wind power.

Furthermore, in another embodiment shown in FIG. 8, in the case of using the sawteeth 250 formed on the outer circumference of the rotating coil plate 200 and the air injection nozzle 800 installed in the clamp ring 330 of the main body 500, when injecting air in a state where a conventional air injector is connected to the air injection nozzle 800, the injected air applies a pressure to the linear parts 251 of the sawteeth 250 to rotate the rotating coil plate 200. Therefore, the rotating coil plate 200 can be rotated to generate electricity.

Therefore, the portable power storage device 1 with a self-generation and nano-capacitor storage structure of the present invention can generate and store electricity through self-generation power as described above. Therefore, it is possible to output and use electricity anytime and anywhere as necessary.

Figure 10:
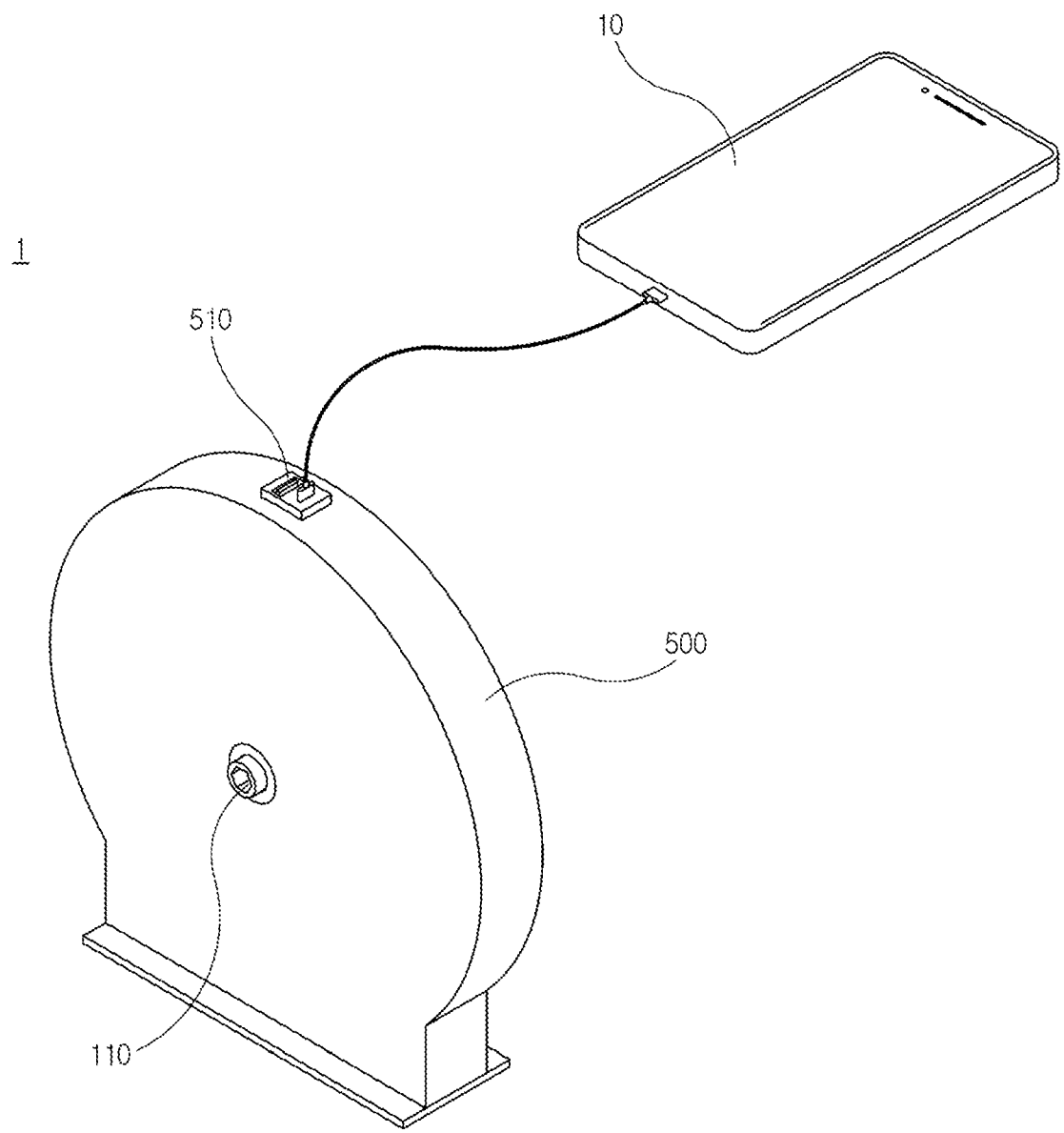
FIG. 10 is a perspective view illustrating a state where the portable power storage device with a self-generation and nano-capacitor storage structure of the present invention is used in an electric device.

To this end, as shown in FIG. 10, the output connector 510 formed in the main body 500 is used. That is, a portable electric device 10 to be used through the output connector 510, for example, a common mobile phone or a portable electric fan, can be connected to the inventive device and used.

That is, when connecting both ends of a cable to the output connector 510 and a connector of the electric device 10, electricity stored in the power storage unit 400 may be output and used. In this case, since the connection terminal 401 of the power storage unit 400 is maintained in contact with the fixed magnet plates 300 and 300' or brushes 340, 340' made of a conductive material such as aluminum, the electricity stored in the power storage unit 400 may be output to the output connector 510 through the fixed magnet plate 300 and 300', thus to be conveniently used in the electric device 10.

Meanwhile, when outputting and using electricity as described above in the present invention, the power storage unit 400 formed in the rotating coil plate 200 is always maintained in contact with the fixed magnet plates 300 and 300' or the brushes 340 and 340' through the connection terminal 401 during the rotating coil plate 200 rotates. Therefore, even in the process of power generation by rotation of the rotating coil plate 200, electricity can be naturally output and used in the electric device 10.

As described above, according to the portable power storage device with a self-generation and nano-capacitor storage structure of the present invention, it is easy to carry and electricity may be generated and stored in various ways without being limited to time and place, and the stored electricity may be output and used, such that efficiency in its use may be further improved.

DESCRIPTION OF REFERENCE NUMERALS

100 Shaft assembly
110 Rotor shaft
120,120' Bushing
200 Rotating coil plate
210 Coil body
250 Sawtooth
251 Linear part
252 Inclined part
300,300' Fixed magnet plate
310,310' Induction magnet body
320,320' Opening part
330 Clamp ring
340,340' Brush
400 Power storage unit
401 Connection terminal
410 Rectifying element
420 Constant voltage unit
500 Main body
510 Output connector
600 Rotary operation lever
700 Fan
800 Air injection nozzle

What is claimed is:

1. A portable power storage device with a self-generation and nano-capacitor storage structure, the portable power storage device comprising:

a shaft assembly which includes a non-conductive rotor shaft having a tool connection part formed at an end thereof, and conductive fixed shafts disposed on both sides of the rotor shaft to face each other at positions spaced apart from a center thereof, wherein bearings are mounted between the rotor shaft and the fixed shafts;

a rotating coil plate which is made of a non-conductive material and is coupled to the rotor shaft between the fixed shafts, wherein bearings are mounted between an inner circumference of the fixed shafts and outer circumferences of the rotor shaft so as to allow the rotating coil plate to rotate freely, wherein a plurality of coil bodies having a core-less coil winding structure are radially arranged in the rotating coil plate;

a pair of fixed magnet plates which are made of an aluminum material so as to have conductivity, and are mounted on the fixed shafts, respectively, so as to be spaced apart from both sides of the rotating coil plate, wherein a plurality of induction magnet bodies corresponding to the plurality of coil bodies are arranged radially therein, and a plurality of opening parts are alternately formed between adjacent induction magnet bodies, wherein respective outer peripheries of the pair of fixed magnet plates are connected to each other through a clamp ring;

a power storage unit which is installed in the rotating coil plate, and is connected to the plurality of coil bodies through a rectifying element and a constant voltage unit to store generated electricity, wherein the power storage unit is configured to conduct the electricity with the pair of fixed magnet plates through a connection terminal to receive the electricity from the fixed magnet plates; and a main body in which both ends of the rotor shaft are exposed to an outside, and is configured to surround and accommodate the rotating coil plate and the pair of fixed magnet plates so that the fixed shafts and the pair of fixed magnet plates are fixed therein, wherein an output connector is installed therein, which is connected to the pair of fixed magnet plates to receive the electricity and output the electricity to the outside, wherein, when the rotating coil plate rotates, the electricity is generated by induction action between the plurality of coil bodies and the plurality of induction magnet bodies of the pair of fixed magnet plates, and the generated electricity is stored in the power storage unit, and wherein the power storage unit is installed at a position where it is eccentric from a center of the rotating coil plate to one side, such that a center of gravity of the rotating coil plate is always positioned at a lower portion thereof.

2. The portable power storage device according to claim 1, wherein the plurality of coil bodies installed in the rotating coil plate penetrate both sides of the rotating coil plate, to perform the mutual induction action with the plurality of induction magnet bodies installed in the pair of fixed magnet plates.

3. The portable power storage device according to claim 1, wherein the plurality of coil bodies of the rotating coil plate have a winding structure in which a winding direction of a coil of a coil body is opposite to the winding direction of a coil of another coil body adjacent thereto, and the plurality of induction magnet bodies of the pair of fixed magnet plates are configured to have opposite polarities at positions to face each other.

4. The portable power storage device according to claim 1, wherein the pair of fixed magnet plates further comprise brushes which are installed on a surface corresponding to the rotating coil plate so as to conduct the electricity, and the brushes are connected to the connection terminal of the power storage unit so as to conduct the electricity.

5. The portable power storage device according to claim 1, wherein the power storage unit includes a nano-capacitor.

6. The portable power storage device according to claim 1, further comprising a rotary operation lever detachably coupled to the tool connection part of the rotor shaft to apply a rotational force to the rotor shaft during operation.

7. The portable power storage device according to claim 1, further comprising a fan detachably coupled to the tool connection part of the rotor shaft to convert wind energy into rotational motion during operation, thus to apply a rotational force to the rotor shaft.

8. The portable power storage device according to claim 1, wherein the rotating coil plate further comprises sawteeth including linear parts and inclined parts continuously and alternately formed on an outer circumference thereof, wherein the main body further comprises an air injection nozzle inserted into the clamp ring of the pair of fixed magnet plates in such a way that an inner end thereof is disposed to face the linear parts of the sawteeth, and wherein a rotational force is applied to the rotor shaft by air supplied through the air injection nozzle.

* * * * *